United States Patent [19]

Yamamura et al.

[11] Patent Number: 5,207,861
[45] Date of Patent: May 4, 1993

[54] PROCESS FOR PRODUCING A HIGH STRENGTH AND HIGH TOUGHNESS SINTER

[75] Inventors: Takemi Yamamura; Toshihiro Ishikawa; Makoto Tamura; Masaki Shibuya, all of Yamaguchi; Kiyohito Okamura, Ibaragi; Mitsuhiko Sato, Ooarai, all of Japan

[73] Assignee: Ube Industries, Ltd., Yamaguchi, Japan

[21] Appl. No.: 606,762

[22] Filed: Oct. 31, 1990

Related U.S. Application Data

[62] Division of Ser. No. 265,254, Oct. 31, 1988, Pat. No. 4,990,470.

[30] Foreign Application Priority Data

Nov. 5, 1987 [JP] Japan ................. 62-279884
Nov. 5, 1987 [JP] Japan ................. 62-279885
Nov. 5, 1987 [JP] Japan ................. 62-279886
Feb. 5, 1988 [JP] Japan ................. 63-26198
Feb. 5, 1988 [JP] Japan ................. 63-26199
Feb. 5, 1988 [JP] Japan ................. 63-26200
Sep. 8, 1988 [JP] Japan ................. 63-225197

[51] Int. Cl.$^5$ ............... C04B 37/00; B29C 71/00
[52] U.S. Cl. ..................... 156/89; 264/60; 264/65; 264/258
[58] Field of Search ............. 264/60, 258, 65; 156/89

[56] References Cited

U.S. PATENT DOCUMENTS 4,613,473 9/1986 Layden et al. ............... 264/103
4,837,230 6/1989 Chen et al. .................. 501/88

Primary Examiner—Jan H. Silbaugh
Assistant Examiner—Christopher A. Fiorilla
Attorney, Agent, or Firm—Frishauf, Holtz, Goodman & Woodward

[57] ABSTRACT

The high-strength and high-toughness sinter of the present invention includes a crystal agglomerate maintaining a fibrous shape and composed of crystals of SiC and $MC_{1-x}$ wherein M is Ti and/or Zr and x is a number of 0 or more but less than 1. This sinter is produced by laminating an inorganic fiber of a particular inorganic material containing titanium and/or zirconium molding the laminate into a predetermined shape, and conducting heat-sintering simultaneously with the molding or after the molding in an atmosphere of a vacuum, an inert gas, a reducing gas, or a hydrocarbon gas at a temperature of 1,700 to 2,200° C.

5 Claims, 2 Drawing Sheets

PROCESS FOR PRODUCING A HIGH STRENGTH AND HIGH TOUGHNESS SINTER

This is a division of application Ser. No. 07/265,254 filed Oct. 31, 1988, now U.S. Pat. No. 4,990,470.

BACKGROUND OF THE INVENTION

1. Field of the Invention

The present invention relates to a high-strength and high-toughness sinter (ceramic composite material) and a process for producing the same. The high-strength and high-toughness sinter according to the present invention is used mainly for applications such as members of an internal combustion engine, e.g., a piston ring or an auxiliary combustion chamber, and members of a rocket engine, e.g., a nose cone or a nozzle.

2. Description of the Prior Art

Ceramics having excellent heat resistance known to the art include, e.g., oxide ceramics such as $Al_2O_3$, $B_4O$, $MgO$, $ZrO_2$, and $SiO_2$, carbide ceramics such as SiC, TiC, WC, and $B_4C$, nitride ceramics such as $Si_3N_4$, BN, and AlN, boride ceramics such as $TiB_2$ and $ZrB_2$, and silicide ceramics such as $MoSi_2$, $WSi_2$, and $CrSi_2$. Molded articles of these ceramics have been hitherto prepared at a very high temperature. In recent years, a sintering assistant has been energetically studied for the purpose of lowering the sintering temperature and the sintering pressure. The sintering assistant serves to improve the sinterability of ceramics and, at the same time, to prevent the sinter particles from growing, so that not only the formation of voids among the particles is prevented but also the grain boundaries are packed at a high density.

Examples of the sintering assistant used in the art include MgO, NiO, CaO, $TiO_2$, $Al_2O_3$, $Y_2O_3$, $B_4C$, B, and C. These additives are selected because they can bring about the occurrence of a phase reaction between the base ceramic and the additive so as to promote the sintering of the ceramic having a poor self-sinterability or because the sintering can easily proceed due to the formation of a plasticized liquid phase by the additive at a high temperature. Further, B and C can serve to enhance the sinterability through a lowering in the surface energy of SiC crystals.

However, when the above-described sintering assistants are present, there is a possibility that second and third phases are formed due to the reaction of a base ceramic with an assistant. These phases are present mainly at the crystal grain boundaries, and constituents of these phases bring about plastic deformation when exposed to a high temperature, which makes it impossible to produce a sinter having excellent high-temperature strength. For example, the addition of MgO to $Si_3N_4$ brings about the formation of a vitreous phase comprising $SiMgO_3$. Since this fills up the grain boundaries, an increase in the density can be attained. However, the mechanical strength of the sinter at a high temperature is sharply lowered at about 1,000° C. due to the softening of the vitreous phase. In order to avoid the abovedescribed lowering in the strength at a high temperature, it is preferred to select an assistant which does not form any vitreous phase. However, this kind of assistant is generally low in the ability of sintering, so that it becomes impossible to produce a satisfactory molded material.

As a means for eliminating the above-described inconvenience, a proposal has been made on a process for producing a ceramic sinter less susceptible to the lowering in the strength at a high temperature wherein a particular organometallic polymer is used as a binder for a ceramic powder and a mixture of the ceramic powder with the binder is heat sintered.

For example, U.S. Pat. Nos. 4,336,215 and 4,556,526 each disclosed a process for producing a sinter which comprises heat-sintering a mixture of a polymetallocarbosilane with a ceramic powder after molding or simultaneously with the molding.

In the process described in the above-described U.S. Patents, the polymetallocarbosilane used as a binder of a ceramic powder is converted into an inorganic material when the mixture is heated at a high temperature. Since this inorganic material is a substance having a high melting point, the resultant sinter has relatively high strength even at a high temperature. This is because, as described on col. 6, lines 18 to 31 of the U.S. Pat. No. 4,336,215, the sinter produced in the process described in the above-described patents mainly comprises silicon carbide particles, a solid solution composed of SiC and TiC each produced by thermal decomposition of polytitanocarbosilane, and a grain boundary phase mainly composed of $TiC_{1-x}$.

With respect to the strength of sinters produced by the processes described in the above-described patents, for example, a sinter having a deflective strength (bending strength) of 13.0 kg/mm² was produced in Example 7 of the U.S. Pat. No. 4,336,215 by molding a mixture of a silicon carbide powder with polytitanocarbosilane and sintering the molded material at 1,200° C., and a sinter having a deflective strength (bending strength) of 25.1 kg/mm² was produced in Example 11 of the same U.S. Patent by preliminarily heating the above-described mixture at 600° C., grinding the heated mixture, and hot-pressing the ground mixture at 1800° C.

In recent years, engineering ceramics have been required to have higher functions. For example, the development of a sinter which has high strength and hardly brings about a lowering in the strength at a high temperature has been desired.

SUMMARY OF THE INVENTION

An object of the present invention is to provide a process for producing a high-strength and high-toughness sinter which has high mechanical strength and excellent heat resistance at room temperature, hardly brings about a lowering in the strength even at a high temperature, and further has excellent toughness.

The above-described object of the present invention can be attained by a high-strength and high-toughness sinter comprising a crystal agglomerate maintaining a fibrous shape and composed of crystals of SiC and $MC_{1-x}$ wherein M is Ti and/or Zr and x is a number of 0 or more but less than 1 (hereinafter referred to as the "first ceramic sinter").

Further, the above-described object of the present invention can be attained by a high-strength and high toughness sinter comprising flaky and/or acicular SiC crystals and an ultrafine grain agglomerate composed of SiC and and MC wherein M is Ti and/or Zr (hereinafter referred to as the "second ceramic sinter").

The present invention also provides a preferable process for producing the above-described first ceramic sinter, more specifically a process for producing a high-strength and high-toughness sinter comprising a crystal agglomerate maintaining a fibrous shape and composed of crystals of SiC and $MC_{1-x}$ wherein M is Ti and/or Zr and x is a number of 0 or more but less than 1, which comprises laminating an inorganic fiber composed of the following inorganic material (i), (ii), or (iii) to form a laminate, molding the laminate into a predetermined shape, and conducting heat-sintering simultaneously with the molding or after the molding in an atmosphere comprising at least one member selected from the group consisting of a vacuum, an inert gas, a reducing gas, and a hydrocarbon gas at a temperature of 1,700 to 2,200° C.:

(i) an amorphous substance essentially consisting of silicon, M, carbon, and oxygen,
(ii) an agglomerate comprising fine crystalline grains each having a diameter of 500 Å or less and essentially consisting of $\beta$-SiC, MC, a solid solution composed of $\beta$-SiC and MC and/or $MC_{1-x}$, wherein $SiO_y$ and $MO_z$, wherein $0 < y, z \leq 2$, may be present around these ultrafine crystalline grains, and
(iii) a system comprising a mixture of said amorphous substance (i) with said agglomerate (ii), wherein M is Ti and/or Zr and X is a number of 0 or more but less than 1.

Further, the present invention provides a preferable process for producing the above-described second ceramic sinter, more specifically a process for producing a high-strength and high toughness sinter comprising flaky and/or acicular SiC crystals and an ultrafine grain agglomerate composed of SiC and MC, which comprises molding into a predetermined shape either a mixture or a laminate prepared by mixing or laminating an inorganic fiber composed of the following inorganic material (i), (ii), or (iii) and a powder having the same composition as that of said inorganic fiber or a powder of the following inorganic material (iv), (v), or (vi), or a powder prepared by grinding an inorganic fiber composed of the following inorganic material (i), (ii), or (iii), and conducting heat-sintering simultaneously with the molding or after the molding in an atmosphere comprising at least one member selected from the group consisting of a vacuum, an inert gas, a reducing gas, and a hydrocarbon gas at a temperature of 1,700 to 2,200° C.:

(i) an amorphous substance essentially consisting of silicon, M, carbon, and oxygen, wherein M is Ti and/ or Zr and x is a number of 0 or more but less than 1,
(ii) an agglomerate comprising fine crystalline grains each having a diameter of 500 Å or less and essentially consisting of $\beta$-SiC, MC, a solid solution composed of $\beta$-SiC and MC and/or $MC_{1-x}$, wherein $SiO_y$ and $MO_z$, wherein $0 < y, z \leq 2$, each in an amorphous and/or crystalline form may be present around these ultrafine crystalline grains,
(iii) a system comprising a mixture of said amorphous substance (i) with said agglomerate (ii),
(iv) an amorphous substance essentially consisting of Si, C, and O,
(v) an agglomerate comprising ultrafine crystalline grains each having a diameter of 500 Å or less and essentially consisting of $\beta$-SiC, wherein $SiO_y$ in an amorphous and/or crystalline form may be present around the ultrafine crystalline grains, and
(vi) a system comprising a mixture of said amorphous substance (iv) with said agglomerate (v).

The sinter of the present invention has high mechanical strength and excellent heat resistance at room temperature, hardly brings about a lowering in the strength even at a high temperature and further has excellent toughness, and the process of the present invention enables the above-described sinter to be produced on an industrial scale.

DETAILED DESCRIPTION OF THE INVENTION

Figure 1:
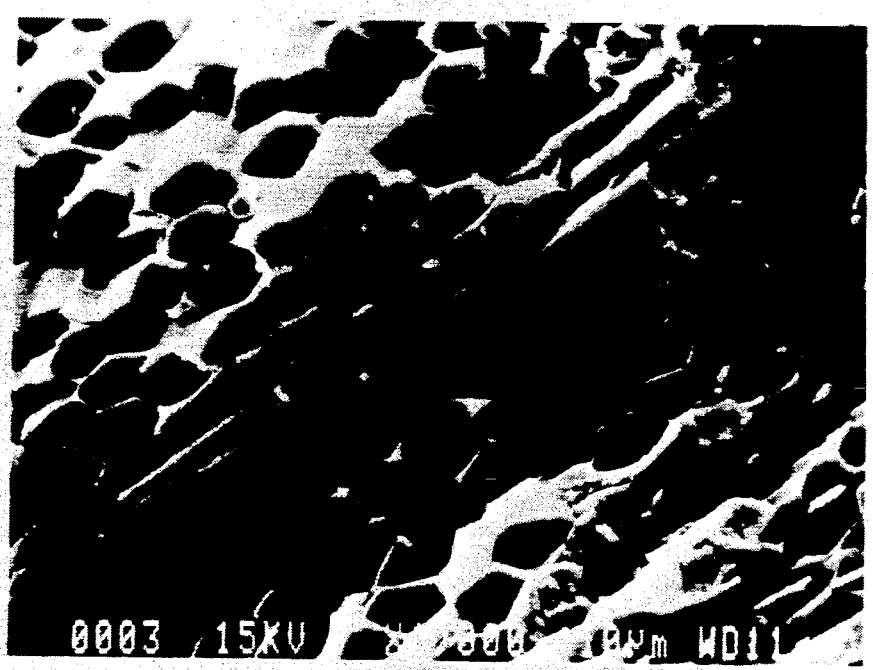
FIG. 1 is a surface reflection electron photomicrograph showing the structure of a crystal of a ceramic sinter according to the present invention prepared in Example 1.

At the outset, the first ceramic sinter of the present invention will be described.

It is preferred that the crystal agglomerate maintaining a fibrous shape and constituting the first ceramic sinter of the present invention comprises at least one member selected from among massive, flaky, and acicular SiC crystals, and crystals in the form of an ultrafine grain composed of SiC and $MC_{1-x}$, wherein M is Ti and/or Zr and x is a number of 0 or more but less than 1. The term "massive" used herein is intended to mean preferably a mass having a side length of 1 to 20 $\mu$m in which grains are grown in the three-dimensional direction, the term "flaky" used herein is intended to mean preferably a scale having a length of 1 to 20 $\mu$m, and the term "acicular" used herein is intended to mean preferably a shape having a length of 1 to 20 $\mu$m and a length to thickness ratio of 1.5 to 20. The size of the above-described ultrafine particle crystal is usually 500 Å or less.

It is preferred that the first ceramic sinter of the present invention contains 40% by weight of massive, flaky, or acicular SiC crystals. When the amount of these crystals is too small, the strength of the sinter is lowered. The upper limit of the amount of these crystals is usually 95% by weight.

Next, the process for producing the first ceramic sinter of the present invention will be described.

The inorganic fiber comprising the above-described inorganic material (i), (ii), or (iii) (hereinafter referred to as the "inorganic fiber [A]") used as the starting material in the process for producing the first ceramic sinter of the present invention exhibits high self-sinterability, which makes it possible to produce an excellent sinter through a treatment at 1,700 to 2,200° C. without addition of any sintering assistant.

The inorganic fiber [A] can be prepared by a process described in U.S. Pat. Nos. 4,342,712, 4,515,742 or the like. For example, said inorganic fiber [A] can be prepared by melt-spinning polytitanocarbosilane or polyzirconocarbosilane, making the resultant fiber infusible through a heat treatment in the air, and baking the fiber in an inert gas at 800 to 1,500° C.

The above-described inorganic fiber may be used in the form of a continuous fiber, a chopped short fiber prepared by cutting a continuous fiber, a weave such as a plain weave, a three-dimensional weave, or a nonwoven fabric prepared from a continuous fiber, and a sheet material prepared by drawing and arranging a continuous fiber in one direction.

According to the present invention, crystals are preferentially grown within an inorganic fiber, so that it becomes possible to produce a ceramic sinter which exhibits a crystal orientation reflecting the form of use of the fiber and has been deformed so as to fill up the gaps between the fibers most effectively. For example, the use of the abovedescribed plain weave as the inorganic fiber brings about the formation of a sinter wherein a crystal agglomerate maintaining a fibrous shape is in the same oriented state as that of the plain weave laminate, the use of the above-described sheet material as the inorganic fiber brings about a sinter wherein a crystal agglomerate maintaining a fibrous shape is in the same oriented state as that of a sheet material laminate drawn in one direction, the use of the above-described three-dimensional weave as the inorganic fiber brings about a sinter wherein a crystal agglomerate maintaining a fibrous shape is in the same oriented state as that of the three-dimensional weave, and the use of the above-described chopped short fiber as the inorganic fiber brings about the formation of a sinter wherein a crystal agglomerate maintaining a fibrous shape is oriented at random. The above-described sinters are each prepared in such a state that the section of the crystal agglomerate maintaining a fibrous shape is deformed to have a polygonal shape and the crystal agglomerates are excellently linked or bonded to each other without the intervention of any matrix among them.

Accordingly, in the present invention, the ceramic sinter having excellent performance can be produced by preparing an inorganic fiber laminate and conducting heat-sintering after molding of the laminate into a desired shape or simultaneously with the molding.

The sintering can be conducted by a process wherein a laminate after molding is sintered under enhanced, atmospheric or reduced pressure or a hot press process wherein molding and sintering are simultaneously conducted.

In the above-described process which comprises conducting molding and sintering in a separate manner, molding is conducted by pressing the laminate under a pressure of 100 to 5,000 kg/cm² through a mold press process, a rubber press process, an extrusion process, or a sheet process to have a predetermined shape. In the above-described molding, if necessary, a starting material of the inorganic fiber, i.e., polycarbosilane or polytitanocarbosilane, polyzirconocarbosilane, or a commercially available organic polymer may be used as a binder. The molding prepared above is then sintered to give a ceramic sinter of the present invention.

When sintering is conducted by the hot press process, a mold made of graphite and sprayed with a releasing agent composed of BN is used, and the laminate is pressed under a pressure of 2 to 2,000 kg/cm² with heating, thereby giving a sinter.

The heat-sintering temperature is 1,700 to 2,200° C., preferably 1,900 to 2,100° C. The heating at this temperature brings about the formation of massive, flaky, and/or acicular SiC crystals, thus forming a high-strength and high-toughness ceramic sinter wherein the SiC crystals are uniformly dispersed in an ultrafine grain agglomerate comprising SiC and TiC and/or ZrC. When the heat-sintering temperature is below 1,700° C., no massive, flaky, or acicular SiC crystal is formed, which makes it impossible to produce a high-strength sinter. On the other hand, when the heat-sintering temperature is above 2,200° C., the formed SiC crystals are apt to be decomposed. The heat-sintering is conducted in an atmosphere comprising at least one member selected from the group consisting of a vacuum, an inert gas, a reducing gas, and a hydrocarbon gas. Examples of the inert gas include nitrogen and carbon dioxide gases, examples of the reducing gas include hydrogen and carbon monooxide gases, and examples of the hydrocarbon gas include methane, ethane, propane, and butane gases.

The first ceramic sinter of the present invention exhibits much higher strength at room temperature than that of conventional ceramic sinters, hardly brings about a lowering in the strength even at a high temperature, and exhibits a fracture toughness value 2 to 10 times higher than that of the conventional ceramic sinters. The oxygen and at least part of carbon in a nonstoichiometric amount contained in the inorganic fiber are released during the above-described sintering according to the following reaction:

$$2C + SiO \rightarrow SiC + CO$$

$$3C + SiO_2 \rightarrow SiC + 2CO.$$

Presumably this brings about a lowering in the surface energy of the SiC grain and thus improves the sinterability. However, the sinter may contain 10% by weight, based on the sinter, of free carbon in a non-stoichiometric amount with respect to the silicon atom and M and further 15% by weight, based on the sinter, of oxygen in the form of $SiO_y$, wherein $0 < y \leq 2$, and/or $MO_z$, wherein $0 < z \leq 2$.

The sinter may be produced also by, if necessary, impregnating the above-described molding of the laminate before sintering with a starting material of the inorganic fiber, i.e., polycarbosilane or polytitanocarbosilane, polyzirconocarbosilane, or a silane coupling agent to treat the surface of the inorganic fiber constituting the above-described laminate, preliminarily heating the treated laminate at 800 to 1,500° C. in an atmosphere comprising at least one member selected from the group consisting of a vacuum, an inert gas, a reducing gas, and a hydrocarbon gas, and sintering the heated laminate at 1,700 to 2,200° C.

Next, the process for producing the second ceramic sinter of the present invention will be described.

When the above description with respect to the first ceramic sinter and the process for producing the same is directly applicable to the second ceramic sinter and the process for producing the same, such description is omitted in the following description according to need. Therefore, the above description applies where there is not detailed description or only an insufficient description hereinbelow.

The ceramic sinter of the present invention comprises flaky and/or acicular SiC crystals and an ultrafine grain agglomerate composed of SiC and MC.

It is preferred that the ceramic sinter of the present invention contain the flaky and/or acicular SiC crystals in an amount of 40% by weight. When the amount of these crystals is too small, the strength of the composite material is lowered. Further, the upper limit of the amount of these crystals is usually 95% by weight.

The starting materials used in the process for producing the second ceramic sinter of the present invention, i.e., the inorganic fiber containing silicon, carbon, and oxygen and comprising the above-described inorganic material (iv), (v), or (vi) (hereinafter referred to as the "inorganic fiber [B]"), the above-described inorganic fiber [A], and a powder prepared by grinding said inorganic fiber [A] (hereinafter referred to as the "powder [A]") are all so highly sinterable that it is possible to produce a sinter through a treatment at a temperature of 1,700 to 2,200° C. without addition of any sintering assistant. In particular, the inorganic fiber [A] or a powder prepared by grinding said inorganic fiber [A] is highly sinterable, which makes it possible to produce an excellent sinter through heat-sintering at the above-described temperature. When the diameter of the fine crystalline grains constituting the above-described inorganic materials (ii) and (iv) exceeds 500 Å, the strength of the sinter is lowered.

The inorganic fiber [B] can be prepared by melt-spinning polycarbosilane prepared according to a process described in Japanese Patent Laid-Open No. 126300/1976, 139929/1976, or the like, making the resultant fiber infusible through a heat treatment in the air, and baking the treated fiber at 800 to 1,500° C.

There is no particular limitation with respect to the form of use of the inorganic fiber [A] or [B], and as with the case of the first ceramic sinter, they may be used in the form of a continuous fiber, a chopped short fiber prepared by cutting a continuous fiber, a weave such as a plain weave, a three-dimensional weave, or a non-woven fabric prepared from a continuous fiber, and a sheet material prepared by drawing and arranging a continuous fiber in one direction.

There is no particular limitation with respect to the powder used in the process for producing the second ceramic sinter of the present invention as far as the powder has the same composition as that of the inorganic fiber [A] or [B], and examples of the powder include a ground product of the abovedescribed inorganic fiber and a ground product of a sintered and molded material having the same composition as that of the inorganic fiber. For example, the inorganic fiber [A] can be ground into a powder with a grinder known to the art, e.g., a ball mill, a vibrating mill, an attritor, or the like. The particle diameter of the powder is usually 1 to 50 μm.

There is no particular limitation also with respect to the proportion of the inorganic fiber to the powder, and the inorganic fiber is usually used in an amount of 10 to 70% by weight based on the total amount of the inorganic fiber and the powder.

With respect to the combination of the inorganic fiber with the powder, it is necessary to use the inorganic fiber [A] or a ground product thereof as at least one of the fiber and the powder. Examples of the combination include:

(1) a combination of the inorganic fiber [A] with a ground product of said fiber [A], (2) a combination of the inorganic fiber [A] with a ground product of a sinter having the same composition as that of said fiber [A], (3) a combination of the inorganic fiber [A] with the inorganic fiber [B], (4) a combination of the inorganic fiber [A] with a ground product of a sinter having the same composition as that of the inorganic fiber [B], and (5) a combination of the inorganic fiber [B] with a ground product of the inorganic fiber [A].

It is preferred to mix the inorganic fiber and the powder uniformly with each other. When the inorganic fiber is a chopped material, it may be mixed with the powder by making use of a mixer known to the art. When the inorganic fiber is a long fiber, a woven fabric, or a sheet material, the inorganic fiber layer and the powder layer may be put on top of each other to prepare a laminate.

The second ceramic sinter of the present invention may also be produced by using only the above-described powder [A] as the starting material. Alternatively, said powder [A] may be used in combination with the inorganic fiber [B]. The inorganic fiber [B] has the same shape as that of the inorganic fiber [A], and the particle diameter of the powder of the inorganic fiber [B] (hereinafter referred to as the "powder [B]") also is the same as that of the powder [A]. The powder [B] is used in an amount of generally 0 to 200 parts by weight, preferably 0 to 100 parts by weight based on 100 parts by weight of the powder [A].

The above-described mixture or laminate, or powder [A], alone or a mixture of the powder [A] with the powder [B] is then heat-sintered after molding into a desired shape or simultaneously with the molding to produce the second ceramic sinter of the present invention.

The sintering may be conducted by a process wherein the above-described mixture, laminate, or powder is molded and then sintered under enhanced, atmospheric or reduced pressure, or a hot press process wherein molding and sintering are simultaneously conducted.

In the process which comprises conducting molding and sintering in a separate manner, molding and sintering may be conducted in the same manner as those in the process of producing the first ceramic sinter.

When sintering is conducted by the hot press process, a mold made of graphite and sprayed with a releasing agent composed of BN is used, and the mixture, laminate, powder [A] alone, or mixture of the powder [A] with the powder [B] is pressed under a pressure of 2 to 2,000 kg/cm$^2$ with heating, thereby giving a sinter.

The heat-sintering temperature is 1,700 to 2,200° C., preferably 1,900 to 2,100° C. The heating at this temperature brings about the formation of massive, flaky, and/or acicular SiC crystals, thus forming a high-strength ceramic composite material wherein the SiC crystals are uniformly dispersed in an ultrafine grain agglomerate as a matrix comprising SiC and MC. When the heat-sintering temperature is below 1,700° C., neither massive nor acicular SiC crystal is formed, which makes it impossible to produce a high-strength composite material. On the other hand, when the heat-sintering temperature is above 2,200° C., the formed SiC crystals or the matrix are apt to be decomposed.

The second ceramic sinter of the present invention exhibits much higher strength at room temperature than that of conventional ceramic composite material, hardly brings about a lowering in the strength even at a high temperature, and further exhibits a fracture toughness value 1.2 to 1.5 times higher than that of the conventional ceramic sinters.

The oxygen and at least part of carbon in a non-stoichiometric amount contained in the inorganic fiber are released during the above-described sintering according to the following reaction:

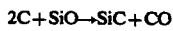

Presumably this brings about a lowering in the surface energy of the SiC grain and thus improves the sinterability. However, the sinter may contain 10% by weight, based on the sinter, of free carbon in a non-stoichiometric amount with respect to the silicon atom and M and further 15% by weight, based on the sinter, of oxygen in the form of $SiO_y$, wherein $0 < y \leq 2$, and/or $MO_z$, wherein $0 < z \leq 2$.

Further, if necessary, as in the case of the production of the first ceramic sinter, the sintering may be conducted after the molded material of the powder is impregnated with the starting material of the inorganic fiber [A] or [A].

The above-described object of the present invention can be attained also by a high-strength ceramic sinter comprising flaky, massive, or acicular SiC crystals and an ultrafine grain SiC crystal agglomerate uniformly dispersed in each other. A preferable process of producing this high-strength ceramic sinter includes a process for producing a ceramic composite material comprising flaky, massive, and/or acicular SiC crystals and an ultrafine grain SiC crystal agglomerate uniformly dispersed in each other, said process comprising molding into a predetermined shape either a mixture or a laminate produced by mixing or laminating an inorganic fiber composed of the following inorganic material (iv), (v), or (vi) and a powder prepared by grinding said inorganic fiber or a powder prepared by grinding a sinter having the same composition as that of said inorganic fiber, or a filled material prepared by filling fiber gasp of a nonwoven fabric and/or a three-dimensional woven fabric each comprising an inorganic fiber composed of an inorganic material (iv), (v), or (vi).with a fine powder prepared by grinding an inorganic material having the same composition as that of said inorganic fiber, conducting heat-sintering simultaneously with the molding or after the molding in an atmosphere comprising at least one member selected from the group consisting of a vacuum, an inert gas, a reducing gas, and a hydrocarbon gas at a temperature of 1,700 to 2,200° C.

The detail of the above-described ceramic sinter and the process for preparing the same is identical to that of the above-described first and second ceramic sinters and the process for preparing the same and therefore may be easily understood by referring to the above description.

The present invention will now be described with reference to the following Examples.

REFERENCE EXAMPLE 1

A 5-λ three-necked flask was charged with 2.5 λ of anhydrous xylene and 400 g of sodium. The mixture was heated to the boiling point of xylene under a nitrogen gas stream, and 1 λ of dimethyldichlorosilane was dropwise added thereto over a period of 1 hr. After the completion of addition, the mixture was heated under reflux for 10 hr to form precipitates. The precipitates were collected by filtration and washed with methanol and then with water to prepare 420 g of polydimethylsilane in the form of a white powder.

Separately, 759 g of diphenyldichlorosilane and 124 g of boric acid were heated in n-butyl ether in a nitrogen atmosphere at a temperature of 100 to 120° C. to prepare a white resinous material. The resinous material was further heated in vacuo at 400° C. for 1 hr to prepare 530 g of polyborodiphenylsiloxane.

8.27 g of the above-prepared polyborodiphenylsiloxane was mixed with 250 g of the above-described polydimethylsilane. The mixture was heated to 350° C. in a 2-λ quartz tube equipped with a reflux tube in a nitrogen gas stream and polymerized for 6 hr. The reaction product was allowed to cool at room temperature. Xylene was then added thereto to withdraw the reaction product in the form of a solution. Xylene was evaporated, and the residue was concentrated in a nitrogen gas stream at 320° C. for 1 hr to prepare polycarbosilane which is a starting material of the inorganic fiber [B].

REFERENCE EXAMPLE 2

10 g of tetrabutoxysilane was added to 50 g of polycarbosilane prepared in Reference Example 1 which is a starting material of the inorganic fiber [B]. 40 ml of xylene was added to the mixture, and the mixture was then stirred in a nitrogen atmosphere at 130° C. for 1 hr. The temperature was slowly raised, and the mixture was polymerized at 320° C. for 2 hr to prepare polytitanocarbosilane which is a starting material of the inorganic fiber [A].

REFERENCE EXAMPLE 3

Polycarbosilane prepared in Reference Example 1 which is a starting material of the inorganic fiber [B] was melt-spun into a fiber. The fiber was heated in the air to 180° C. at a temperature raising rate of 20° C./hr to make the fiber infusible, heated in a nitrogen atmosphere to 1300° C. at a temperature raising rate of 200° C./hr, and maintained at that temperature for 1 hr. The heat-treated fiber was allowed to cool to prepare the inorganic fiber [B].

The inorganic fiber [B] was ground in a mortar made of silicon nitride to prepare the powder [B] of 200 mesh or less.

REFERENCE EXAMPLE 4

Polytitanocarbosilane prepared in Reference Example 2 which is a starting material of the inorganic fiber [A] was melt-spun into a fiber. The fiber was heated in the air to 180° C. at a temperature raising rate of 20° C./hr to make the fiber insufible, heated in a nitrogen atmosphere to 1300° C. at a temperature raising rate of 200° C./hr, and maintained at that temperature for 1 hr. The heat-treated fiber was allowed to cool to prepare the inorganic fiber [A].

The inorganic fiber [A] was ground in a mortar made of silicon nitride to prepare the powder [A] of 200 mesh or less.

EXAMPLE 1

Polytitanocarbosilane prepared in Reference Example 2 was melt-spun into a fiber. The fiber was heated in the air to 170° C. at a temperature raising rate of 20° C./hr to make the fiber infusible, heated in a nitrogen atmosphere to 1000° C. at a temperature raising rate of 200° C./hr, and maintained at that temperature for 1 hr. The heat-treated fiber was allowed to cool to prepare an inorganic continuous fiber [A].

Plain woven fabrics each comprising the above-described inorganic continuous fiber [A] were put on top of each other. The laminate was set in a carbon die (a sheet material having a size of 3 mm × 10 mm × 10 mm), hot-pressed in an argon gas stream under a pressure of 600 kg/cm$^2$ at 2,000° C. for 0.5 hr to produce the first ceramic sinter of the present invention.

The ceramic sinter of the present invention thus produced had a bending strength of 80 kg/mm$^2$ (at room temperature) and 76 kg/mm$^2$ (at 1400° C.) and a density of 3.0 g/cm$^3$. Further, the ceramic sinter exhibited a fracture toughness value (Kic: 24) 8 times higher than that of a ceramic sinter produced from only the powder without use of the plain woven fabric.

The fracture of the above-described ceramic sinter was observed under a surface reflection electron microscope. As a result, it was found that, as shown in FIG. 1, a fibrous crystal agglomerate which had been deformed into a polygonal form was closely packed in the most effective manner and the orientation of the plain woven fabric was maintained.

Figure 2:
FIG. 2 is a further enlarged surface reflection electron photomicrograph of FIG. 1.

The above-described fibrous crystal agglomerate was further observed with a larger magnification. As a result, it was found that, as shown in FIG. 2, acicular or flaky crystals (SiC) were present.

EXAMPLE 2

Polytitanocarbosilane prepared in Reference Example 2 was melt-spun into a fiber. The fiber was heated in the air to 170° C. at a temperature raising rate of 20° C./hr to make the fiber infusible, heated in a nitrogen atmosphere to 1000° C. at a temperature raising rate of 200° C./hr, and maintained at that temperature for 1 hr. The heat-treated fiber was allowed to cool to prepare an inorganic continuous fiber [A].

Similarly, polycarbosilane prepared in Reference Example 1 was spun, made infusible, and heat-treated to form an inorganic continuous fiber [B]. The inorganic continuous fiber [B] was ground in a mortar made of silicon nitride to prepare a powder of 200 mesh or less. The powder and the above-described inorganic continuous fiber [A] were put on top of each other. The laminate was set in a carbon die (a sheet material having a size of 3 mm × 10 mm × 10 mm), hot-pressed in an argon gas stream under a pressure of 600 kg/cm$^2$ at 2,000° C. for 0.5 hr to produce the second ceramic sinter of the present invention.

The proportion of the above-described plain woven fabric to the above-described powder was 1 : 3.

The ceramic sinter of the present invention thus produced had a bending strength of 87 kg/mm$^2$ (at room temperature) and 84 kg/mm$^2$ (at 1400° C.) and a density of 3.0 g/cm$^3$. Further, the ceramic sinter exhibited a fracture toughness value 1.4 times higher than that of a ceramic sinter produced from only the powder without use of the plain woven fabric.

Figure 3:
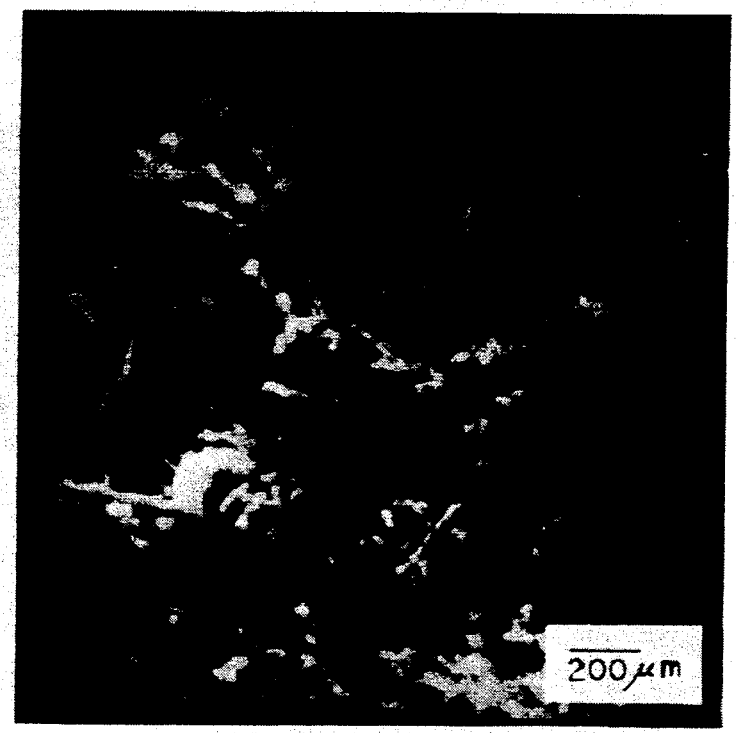
FIG. 3 is a surface reflection electron photomicrograph showing the structure of a crystal of a ceramic sinter according to the present invention prepared in Example 2.

The fracture of the above-described ceramic sinter was observed under a surface reflection electron microscope. As a result, it was found that, as shown in FIG. 3, acicular or flaky crystals (SiC) were present.

EXAMPLE 3

Polytitanocarbosilane prepared in Reference Example 2 was melt-spun into a fiber. The fiber was heated in the air to 170° C. at a temperature raising rate of 20° C./hr to make the fiber infusible, heated in a nitrogen atmosphere to 1200° C. at a temperature raising rate of 200° C./hr, and maintained at that temperature for 1 hr. The heat-treated fiber was allowed to cool to prepare an inorganic continuous fiber [A]. A powder of 200 mesh or less prepared by grinding the inorganic continuous fiber [A] in a mortar made of silicon nitride and a plain woven fabric comprising the above-described continuous fiber [A] were put on top of each other. The laminate was set in a carbon die (a sheet material having a size of 3 mm × 10 mm × 10 mm), hot-pressed in an argon gas stream under a pressure of 700 kg/cm$^2$ at 2,000° C. for 0.5 hr to produce the second ceramic sinter of the present invention.

The proportion of the above-described plain woven fabric to the above-described powder was 1 : 3.

The ceramic sinter of the present invention thus produced had a bending strength of 100 kg/mm$^2$ (at room temperature) and 95 kg/mm$^2$ (at 1400° C.) and a density of 3.1 g/cm$^3$. Further, the ceramic sinter exhibited a fracture toughness value 1.5 times higher than that of a ceramic sinter produced from only the powder without use of the plain woven fabric.

EXAMPLE 4

The powder [A] prepared in Reference Example 4 was set in a carbon die (a sheet material having a size of 3 mm × 10 mm × 10 mm), hot-pressed in an argon gas stream under a pressure of 700 kg/cm$^2$ at 2,100° C. for 0.5 hr to produce the second ceramic sinter of the present invention.

Figure 4:
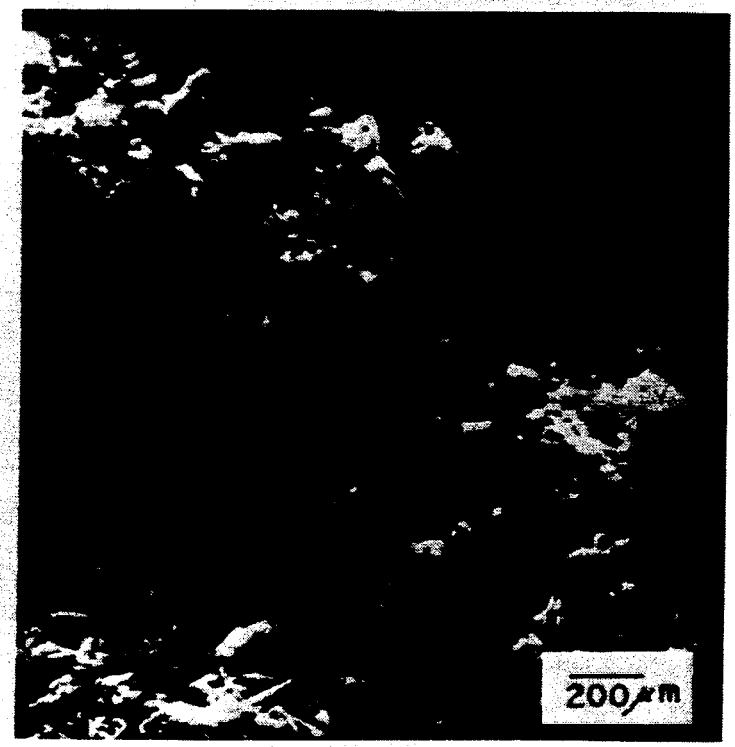
FIG. 4 is a surface reflection electron photomicrograph showing the structure of a crystal of a ceramic sinter according to the present invention prepared in Example 4.

The fracture of the above-described ceramic sinter was observed under a surface reflection electron microscope. As a result, it was found that, as shown in FIG. 4, acicular crystals were dispersed. The ceramic sinter had a bending strength of 80 kg/mm$^2$ at room temperature and 74 kg/mm$^2$ at 1400° C. Further, the ceramic sinter exhibited a fracture toughness value 1.3 times higher than that of the conventional SiC sinter.

EXAMPLE 5

A powder prepared by mixing the powder [A] prepared in Reference Example 4 with the powder [B] prepared in Reference Example 3 in a weight ratio of 1 : 1 was treated in the same manner as that of Example 1 to produce the second ceramic sinter of the present invention. The ceramic sinter thus produced had a bending strength of 75 kg/mm$^2$ at room temperature and 69 kg/mm$^2$ at 1400° C. Further, the ceramic sinter exhibited a fracture toughness value 1.2 times higher than that of the conventional SiC sinter.

EXAMPLE 6

Polycarbosilane prepared in Reference Example 1 was melt-spun into a fiber. The fiber was heated in the air to 170° C. at a temperature raising rate of 20° C./hr to make the fiber infusible, heated in a nitrogen atmosphere to 1000° C. at a temperature raising rate of 200° C./hr, and maintained at that temperature for 1 hr. The heat-treated fiber was allowed to cool to prepare an inorganic continuous fiber [B].

A powder of 200 mesh or less prepared by grinding the inorganic continuous fiber [B] in a mortar made of silicon nitride and a plain woven fabric comprising the above-described continuous fiber were put on top of each other. The laminate was set in a carbon die (a sheet material having a size of 3 mm × 10 mm × 10 mm), hot-pressed in an argon gas stream under a pressure of 700 kg/cm$^2$ at 2,000° C. for 0.5 hr to produce a ceramic sinter.

The proportion of the above-described plain woven fabric to the above-described powder was 1 : 3.

The ceramic sinter thus produced had a bending strength of 76 kg/mm² (at room temperature) and 73 kg/mm² (at 1400° C.) and a density of 3.0 g/cm³. Further, the ceramic sinter exhibited a fracture toughness value 1.4 times higher than that of a ceramic sinter prepared from only the powder without use of the plain woven fabric.

EXAMPLE 7

Polycarbosilane prepared in Reference Example 1 was melt-spun into a fiber. The fiber was heated in the air to 170° C. at a temperature raising rate of 20° C./hr to make the fiber infusible, heated in a nitrogen atmosphere to 1200° C. at a temperature raising rate of 200° C./hr, and maintained at that temperature for 1 hr. The heat-treated fiber was allowed to cool to prepare an inorganic continuous fiber [B].

A powder of 200 mesh or less prepared by grinding the inorganic continuous fiber [B] in a mortar made of silicon nitride and a plain woven fabric comprising the above-described continuous fiber were put on top of each other. The laminate was set in a carbon die (a sheet material having a size of 3 mm×10 mm×10 mm), hot-pressed in an argon gas stream under a pressure of 600 kg/cm² at 2,000° C. for 0.5 hr to produce a ceramic sinter.

The proportion of the above-described plain woven fabric to the above-described powder was 1 : 3.

The ceramic sinter thus produced had a bending strength of 68 kg/mm² (at room temperature) and 63 kg/mm² (at 1400° C.) and a density of 3.1 g/cm³. Further, the ceramic sinter exhibited a fracture toughness value 1.3 times higher than that of a ceramic sinter produced from only the powder without use of the plain woven fabric.

What is claimed is:

1. A process for producing a high-strength and high toughness sinter comprising a crystal agglomerate which maintains a fibrous shape in the sinter and is composed of crystals of SiC and $MC_{1-x}$ wherein M is Ti and/or Zr and x is a number of 0 or more but less than 1, wherein sections of at least part of said crystal agglomerate maintaining the fibrous shape are deformed as will be able to most closely pack to fill up gaps which occur in said crystal agglomerate maintaining the fibrous shape, said process comprising laminating inorganic fibers composed of inorganic material (i), (ii), or (iii) defined below, to form a laminate, molding the laminate into a predetermined shape, and conducting heat-sintering simultaneously with the molding or after the molding in an atmosphere comprising at least one member selected from the group consisting of a vacuum, an inert gas, a reducing gas, and a hydrocarbon gas at a temperature of 1,700 to 2,200° C.;

(i) an amorphous substance consisting essentially of silicon, M, carbon, and oxygen, (ii) an agglomerate comprising fine crystalline grains each having a diameter of 500 Å or less and essentially consisting of β-SiC, MC, a solid solution composed of β-SiC and MC and/or $MC_{1-x}$ wherein $SiO_y$ and $MO_z$, wherein $0<y$, $z≦2$, may be present around these fine crystalline grains, and (iii) a system comprising a mixture of said amorphous substance (i) with said agglomerate (ii); and wherein said inorganic fibers are woven into a plain weave.

2. The process for producing a high-strength and high toughness sinter according to claim 1 wherein the sections of at least part of the fibers of said crystal agglomerate are deformed into a polygonal shape.

3. The process of claim 1, wherein said inorganic material is (i) an amorphous substance consisting essentially of silicon, M, carbon, and oxygen.

4. The process of claim 1, wherein said inorganic material is (ii) an agglomerate comprising fine crystalline grains each having a diameter of 500 Å or less and consisting essentially of β-SiC, MC, a solid solution composed of β-SiC and MC and/or $MC_{1-x}$ wherein $SiO_y$ and $MO_z$, wherein $0<y$, $z≦2$, may be present around these fine crystalline grains.

5. The process of claim 1, wherein said inorganic material is (iii) a system comprising a mixture of said amorphous substance (i) with said agglomerate (ii).

* * * * *